United States Patent
Ouchi et al.

(10) Patent No.: US 9,744,966 B2
(45) Date of Patent: Aug. 29, 2017

(54) STARTUP CONTROL DEVICE AND STARTUP CONTROL METHOD FOR HYBRID VEHICLE

(71) Applicant: Nissan Motor Co., Ltd., Kanagawa (JP)

(72) Inventors: Daisuke Ouchi, Kanagawa (JP); Koichi Nakazato, Kanagawa (JP); Shuichi Orita, Kanagawa (JP); Kenji Hattori, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/024,769

(22) PCT Filed: Sep. 26, 2013

(86) PCT No.: PCT/JP2013/076018
§ 371 (c)(1),
(2) Date: Mar. 24, 2016

(87) PCT Pub. No.: WO2015/045051
PCT Pub. Date: Apr. 2, 2015

(65) Prior Publication Data
US 2016/0244050 A1    Aug. 25, 2016

(51) Int. Cl.
*B60L 9/00*        (2006.01)
*B60W 20/40*     (2016.01)
(Continued)

(52) U.S. Cl.
CPC ............. *B60W 20/40* (2013.01); *B60K 6/387* (2013.01); *B60K 6/46* (2013.01); *B60K 6/48* (2013.01); *B60K 6/54* (2013.01); *B60W 10/02* (2013.01); *B60W 10/06* (2013.01); *B60W 10/08* (2013.01); *B60W 10/107* (2013.01); *B60W 10/26* (2013.01); *B60W 30/194* (2013.01);
(Continued)

(58) Field of Classification Search
CPC .......... B60W 20/40; B60K 6/387; B60K 6/46
See application file for complete search history.

(56) References Cited

U.S. PATENT DOCUMENTS

2005/0200463 A1     9/2005   Situ et al.
2012/0316715 A1*  12/2012  Suzuki ..................... B60K 6/48
                                                          701/22
2016/0153343 A1*   6/2016   Kakehashi ......... B60H 1/00885
                                                          123/41.31

FOREIGN PATENT DOCUMENTS

EP    2532549 A2    12/2012
EP    3045364 A1    7/2016
(Continued)

*Primary Examiner* — Adam Alharbi
(74) *Attorney, Agent, or Firm* — Osha Liang LLP (57) ABSTRACT

A startup control device includes a vehicle temperature sensor configured to sense a temperature of the vehicle, a vehicle startup controller configured to select the second vehicle startup mode in a low temperature state in which the temperature of the vehicle is equal to or smaller than at least a first temperature judgment value when the request of the startup of the vehicle is sensed, and to select the third vehicle startup mode in an extremely low temperature state in which the temperature of the vehicle is equal to or smaller than a second vehicle temperature judgment value which is smaller than the first temperature judgment value when the request of the startup of the vehicle is sensed.

3 Claims, 5 Drawing Sheets

(51) Int. Cl.
*B60K 6/48* (2007.10)
*B60W 10/02* (2006.01)
*B60W 10/06* (2006.01)
*B60W 10/08* (2006.01)
*F02D 29/02* (2006.01)
*F02N 11/08* (2006.01)
*B60K 6/387* (2007.10)
*B60K 6/46* (2007.10)
*B60K 6/54* (2007.10)
*B60W 10/107* (2012.01)
*B60W 10/26* (2006.01)
*B60W 30/194* (2012.01)
*B60W 20/00* (2016.01)
*B60K 6/543* (2007.10)
*B60K 6/365* (2007.10)

(52) U.S. Cl.
CPC .......... *F02D 29/02* (2013.01); *F02N 11/0866* (2013.01); *B60K 6/365* (2013.01); *B60K 6/543* (2013.01); *B60K 2006/4825* (2013.01); *B60W 20/00* (2013.01); *B60W 2400/00* (2013.01); *B60W 2510/0291* (2013.01); *B60W 2510/0676* (2013.01); *B60W 2510/087* (2013.01); *B60W 2510/107* (2013.01); *B60W 2510/246* (2013.01); *B60W 2710/021* (2013.01); *B60W 2710/0605* (2013.01); *B60Y 2200/92* (2013.01); *F02N 2200/061* (2013.01); *F02N 2200/063* (2013.01); *Y02T 10/6221* (2013.01); *Y02T 10/6252* (2013.01); *Y10S 903/91* (2013.01); *Y10S 903/914* (2013.01); *Y10S 903/917* (2013.01); *Y10S 903/93* (2013.01)

(56) References Cited

FOREIGN PATENT DOCUMENTS

| | | |
|---|---|---|
| JP | 2005-255158 A | 9/2005 |
| JP | 2012250676 A | 12/2012 |
| WO | 2013/038857 A1 | 3/2013 |

* cited by examiner

FIG.5

STARTUP CONTROL DEVICE AND STARTUP CONTROL METHOD FOR HYBRID VEHICLE

BACKGROUND

Technical Field

This invention relates to a vehicle startup control for a hybrid vehicle which uses an engine and a traveling motor as a vehicle driving source.

Related Art

A patent document 1 discloses a hybrid vehicle which uses an engine and a traveling motor as a vehicle driving source. This hybrid vehicle includes the traveling motor disposed between the engine and driving wheels; and a clutch disposed between the engine and the traveling motor; and a starter arranged to rotationally drive a crank shaft of the engine. In this hybrid vehicle, as the start method of the engine, the engine can be directly started by the starter, in addition to a method of starting the engine by the traveling motor by engaging the clutch. Accordingly, for example, even when the output of the high power battery arranged to supply the power to the traveling motor is low, it is possible to surely start the engine by the starter. Consequently, it is possible to attain the low capacity (capacity reduction) and the size reduction of the high power battery.

Patent Document 1: Japanese Patent Application Publication No. 2005-255158

SUMMARY

It is desirable to select the startup pattern to bring the vehicle to the vehicle travelable state by the traveling motor without starting the engine, as the vehicle startup pattern at the detection of the vehicle startup request by the operation of the ignition key and the ignition switch by the driver. This is because the time periods during which the vehicle becomes the travelable state after the completion of the startup of the vehicle from the detection of the vehicle startup request is short since the start of the engine is not needed. After the startup of the vehicle is finished and the vehicle becomes the travelable state, the start of the engine is performed in accordance with the accelerator operation and so on by the driver. For example, the engine is started in accordance with the increase of the desired vehicle driving force by the accelerator operation by the driver. The mode is switched from the EV mode in which the traveling motor is mainly used as the driving source, to the HEV mode in which the engine and the traveling motor are used together.

However, in the low temperature state in which the vehicle temperature is low, the temperature of the hydraulic fluid is low, and the viscosity of the hydraulic fluid is high. Accordingly, in a case where the clutch disposed between the engine and the traveling motor is a normally open type hydraulic clutch which is engaged by the supply of the hydraulic pressure, it takes (requires) the time to engage this clutch. Accordingly, in a case where the above-described startup pattern to bring the vehicle to the travelable state by the traveling motor is selected in the low temperature state, for example, when the engine is started immediately after the completion of the startup of the vehicle in accordance with the increase of the desired driving force by the accelerator operation of the driver, it takes the time to start the engine by the traveling motor by engaging the clutch. The response delay of the increase of the vehicle driving force according to the increase of the desired vehicle driving force is generated. It is conceivable that the engine is started by the starter in place of the start of the engine by the traveling motor. However, in this case, the clutch also needs to be engaged after the startup of the engine by the starter. Accordingly, it takes more time.

A hybrid vehicle according to one or more embodiments of the present invention includes an engine; a traveling motor disposed between the engine and the driving wheels; a high power battery arranged to supply a power to the traveling motor; a normally-open type, hydraulic clutch disposed between the engine and the traveling motor, and arranged to be engaged when a hydraulic pressure is supplied, and a starter arranged to rotationally drive a crankshaft of the engine, and thereby to start the engine.

One of vehicle startup modes of a first vehicle startup mode in which the vehicle is brought to a travelable state by the traveling motor, a second vehicle startup mode in which the vehicle is brought to the travelable state by engaging the clutch, and starting the engine by the traveling motor, and a third vehicle startup mode in which the vehicle is brought to the travelable state by engaging the clutch after the engine is started by the starter is selected at least based on the temperature of the vehicle when a request of the startup of the vehicle is sensed.

In particular, the second vehicle startup mode is selected in a low temperature state in which the temperature of the vehicle is equal to or smaller than at least a first temperature judgment value. In this way, in the low temperature state, the vehicle is brought to the travelable state after the clutch is engaged and the engine is started by the traveling motor. With this, even when the desired vehicle driving force is suddenly increased by the operation of the accelerator depression by the driver, it is possible to rapidly increase the vehicle driving force by using both of the engine and the traveling motor. Accordingly, the above-described response delay of the vehicle driving force according to the engagement of the clutch is not caused.

According to one or more embodiments of the present invention, the vehicle startup pattern is appropriately selected in accordance with the vehicle temperature when the vehicle startup request is sensed. With this, it is possible to decrease the vehicle startup time periods. In particular, in the low temperature state in which the viscosity of the hydraulic fluid becomes high, the second vehicle startup mode is selected. The clutch is previously engaged before the completion of the vehicle startup. The engine is started by the traveling motor. With this, it is possible to surely dissolve the response delay of the vehicle driving force according to the clutch engagement and the engine startup after the completion of the vehicle startup.

DETAILED DESCRIPTION

Figure 1:
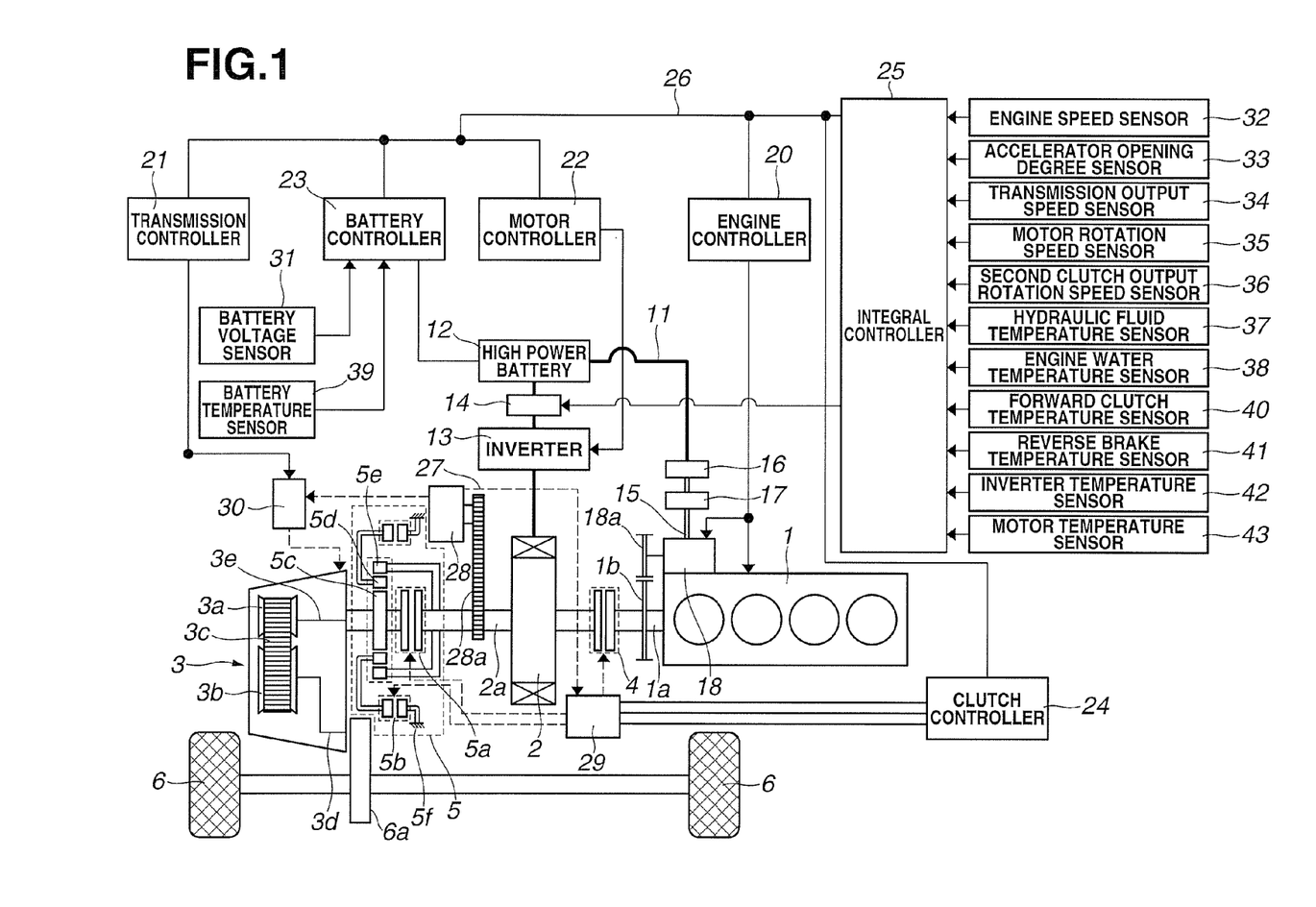
FIG. 1 is a configuration explanatory view showing a system configuration of a hybrid vehicle according to one or more embodiments of the present invention.

Hereinafter, embodiments of the present invention are described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a configuration explanatory view showing a system configuration of a hybrid vehicle of an FF type (front engine/front drive) according to one or more embodiments of the present invention. Besides, in the drawing, bold lines show a high power (high voltage) circuit 11. Double lines show a low power (low voltage) circuit 15. Thin solid lines shows signal lines. Broken arrow lines show a hydraulic pressure circuit 27.

This hybrid vehicle uses, as driving sources of the vehicle, both of an engine 1 and a motor generator 2 which is a motor for running (traveling). This hybrid vehicle is provided with a belt-type continuously variable transmission 3 which is a shift mechanism. A first clutch 4 is disposed in a power transmitting path between the engine 1 and the motor generator 2. The first clutch 4 is arranged to switch connection and a disconnection of the power transmission. Second clutches (5a, 5b) are disposed in a power transmitting path between the motor generator 2 and the belt-type continuously variable transmission 3. The second clutches (5a, 5b) are arranged to switch connection and disconnection of the power transmission.

The engine 1 is, for example, an gasoline engine. In the engine 1, a start control and a stop control are performed based on a control command from an engine controller 20. An opening degree of a throttle valve is controlled based on the control command from an engine controller 20. Moreover, a fuel cut control and so on is performed based on the control command from an engine controller 20.

The first clutch 4 is disposed between a crank shaft 1a of the engine 1 and a rotor of the motor generator 2. The first clutch 4 is arranged to connect the engine 1 to the motor generator 2, or disconnect (separate) the engine 1 from the motor generator 2 in accordance with a selected traveling mode. The engagement and disengagement of the first clutch 4 is controlled by a first clutch hydraulic pressure generated by a clutch hydraulic pressure control section 29 including a hydraulic pressure control valve (not shown), based on a control command from a clutch controller 24. In one or more embodiments of the present invention, the first clutch 4 is engaged in a hydraulic pressure supply state in which the hydraulic pressure is supplied. The first clutch 4 is constantly disengaged by an urging force of a diaphragm spring in a hydraulic pressure releasing state in which the hydraulic pressure is not supplied. Accordingly, the first clutch 3 is a normally-open type, hydraulic pressure type, dry type clutch.

The motor generator 2 is, for example, a synchronous type motor generator of a three-phase alternating current. The motor generator 2 is connected to a high power circuit 11 including a high power (high voltage) battery 12, an inverter 13, and a high power relay 14. In FIG. 1, the high power circuit 11 is represented by the bold solid lines. The motor generator 2 is arranged to perform a motor operation (that is, a power running) to receive a power supply from the high power battery 12 through the inverter 13, and to output a positive torque, and to perform a regenerative operation to absorb the torque to generate the (electric) power, and to charge the high power battery 12 through the inverter 13.

The second clutches (5a, 5b) are provided between the rotor of the motor generator 2 and the input shaft 3e of the continuously variable transmission 3. The second clutches (5a, 5b) are arranged to perform the connection and the disconnection of the power between the driving wheels 6 (front wheels) and the vehicle driving source including the engine 1 and the motor generator 2. The engagement and the disengagement of the second clutches (5a, 5b) are controlled by the second clutch hydraulic pressure supplied to the continuously variable transmission 3 by the clutch hydraulic pressure control section 29 including the hydraulic pressure control valve (not shown). In particular, the second clutches (5a, 5b) can be in a slip engagement state in which the power is transmitted with the slippage, by variably controlling the transmission torque capacity. The second clutches (5a, 5b) enables the smooth start in the configuration in which the torque converter is not provided. The second clutches (5a, 5b) serve for attaining the creep traveling.

In this case, the second clutch is not the single frictional element. A forward clutch 5a or a reverse brake 5b of the forward and reverse movement switching mechanism 5 provided to the input portion of the continuously variable transmission 3 is used as the second clutch. The forward and reverse movement switching mechanism 5 is arranged to switch the direction of the input rotation to the continuously variable transmission 3 between the positive direction at the forward traveling, and the reverse direction at the reverse traveling. The forward and reverse movement switching mechanism 5 includes the forward clutch 5a which is arranged to be engaged at the forward traveling; and the reverse brake 5b arranged to be engaged at the reverse traveling. At the forward traveling, the forward clutch 5a serves as the second clutch. At the reverse traveling, the reverse brake 5b serves as the second clutch. In a state where the both of the forward clutch 5a and the reverse clutch 5b which are the second clutch are disengaged, the torque is not transmitted. The rotor of the motor generator 2 and the continuously variable transmission 3 are substantially disconnected (separated). Besides, in one or more embodiments of the present invention, each of the forward clutch 5a and the reverse clutch 5b is a wet type multiple plate clutch of a normally open type which is engaged when the hydraulic pressure is supplied, and which is disengaged when the hydraulic pressure is released.

The above-described planetary gear mechanism is a single pinion type including a sun gear 5c, a planetary carrier 5d, and a ring gear 5e. The sun gear 5c is connected to the input shaft 3e of the belt-type continuously variable transmission 3. The planetary carrier 5d is connected to a clutch case 5f through the reverse brake 5b. The ring gear 5e is connected to the output shaft 2a of the motor generator 2.

The belt-type continuously variable transmission 3 includes a primary pulley 3a which is an input side; a secondary pulley 3b which is an output side; and a belt 3a which is made from metal, and which is wound around the both pulleys. In the belt-type continuously variable transmission 3, belt contact radii of the pulleys 3a, 3b, that is, the transmission gear ratio is continuously controlled by the primary hydraulic pressure and the secondary hydraulic pressure which are supplied from the transmission hydraulic pressure control section 30 based on the control command from the transmission controller 21. An output shaft 3d of this continuously variable transmission 3 is connected through a final speed reduction mechanism (final drive gear) 6a to the driving wheels 6.

The engine 1 is provided with a starter 18 for the start. This starter 18 is a direct current motor which has a rated voltage (voltage rating) lower than that of the motor generator 2. The starter 18 is connected to a low power circuit 15 including a DC/DC converter 16 and a low power battery 17. The starter 18 is driven based on a control command from the engine controller 20. The starter 18 is arranged to rotationally drive the crank shaft 1a through the engagement between a pinion gear 18a provided to the output shaft of the starter 18, and a ring gear 1b provided to the crank shaft 1a of the engine 1, and thereby to perform the cranking.

In this way, the starter 18 is added to the hybrid vehicle provided with the motor generator 2 which is for traveling. Accordingly, even in a state where the start of the engine 1 by the motor generator 2 cannot be performed or is extremely difficult to be performed like in the extremely low temperature state and in the extremely low output state of the high power battery 12, it is possible to surely start the engine 1 by the starter 18. Consequently, it is possible to decrease the size and the capacity of the high power battery 12 which supplies the power to the motor generator 2.

The low power battery 17 is charged through the DC/DC converter 16 by the power from the high power circuit 11 including the high power battery 12. Besides, the control systems of the vehicle which includes the engine controller 20 and so on, the air conditioning device, the audio device, the lighting, the high power relay 14, and so on receive the power supply by the low power circuit 15.

An oil pump 28, a clutch hydraulic pressure control section 29, and a transmission hydraulic pressure control section 30 are provided to the hydraulic circuit 27 shown by the broken arrow lines of FIG. 1. The oil pump 28 is a mechanical oil pump which is connected through the chain 28a to the output shaft 2a of the motor generator 2, and which is arranged to be rotationally driven by this output shaft 2a. The oil pump 28 is arranged to pressurize the hydraulic fluid supplied from a side of an oil pan (not show), and to discharge this hydraulic fluid to the hydraulic pressure circuit 27. Besides, although it is not shown, an electric oil pump driven by a sub motor may be used together with this mechanical oil pump 28. This electric oil pump may be actuated when the discharge amount and the hydraulic pressure of the hydraulic fluid by the mechanical oil pump 28 are deficient.

As described above, the transmission hydraulic pressure control section 30 controls the primary hydraulic pressure and the secondary hydraulic pressure which are supplied to the belt-type continuously variable transmission, based on the control command from the transmission controller 21. As described above, the clutch hydraulic pressure control section 29 controls the first clutch hydraulic pressure supplied to the first clutch 4, and the second clutch pressure supplied to the second clutches (5a, 5b), based on the control command from the clutch controller 24.

The above-described control system of the hybrid vehicle includes the engine controller 20, the transmission controller 21, the motor controller 22, the clutch controller 24, the battery controller 23 configured to monitor and control a state of the charge (SOC) of the high power battery 12, and an integral controller 25 (described later) configured to perform an integral control of an entire vehicle. These controllers 20, 21, 22, 23, 24, and 25 are connected to one another through CAN communication lines 26 by which the information can be exchanged. Moreover, as sensors configured to sense vehicle driving states, there are provided a battery voltage sensor 31 arranged to sense an output voltage which is a battery output of the high power battery 12; an engine speed sensor 32 arranged to sense an engine speed; an accelerator opening degree sensor 33 arranged to sense an accelerator opening degree of an accelerator pedal operated by a driver; a transmission output rotation speed sensor 34 arranged to sense a rotation speed of the output shaft 3d of the transmission 3; a motor rotation speed sensor 35 arranged to sense a rotation speed of the output shaft 2a of the motor generator 2; a second clutch output rotation speed sensor 36 arranged to sense the rotation speed of the second clutch output shaft (the transmission input shaft 3e), and so on. As sensors arranged to sense a temperature of the vehicle, there are provided a hydraulic fluid temperature sensor 37 arranged to sense a temperature of the hydraulic fluid; an engine water temperature sensor 38 arranged to sense an engine water; a battery temperature sensor 39 arranged to sense a temperature of the high power battery 12; a forward clutch temperature sensor 40 arranged to sense a temperature of the forward clutch 5a; a reverse brake temperature sensor 41 arranged to sense a temperature of the reverse brake 5b; an inverter temperature sensor 42 arranged to sense a temperature of the inverter 13; a motor temperature sensor 43 arranged to sense a motor temperature of the motor generator 2, and so on. The sensed signals of these sensors are inputted respectively or through the CAN communication lines 26 to the respective controllers such as the integral controller 25.

The thus-constructed hybrid vehicle has traveling modes such as an electric vehicle traveling mode (hereinafter, referred to as "EV mode"), a hybrid traveling mode (hereinafter, referred to as "HEV mode"), and a driving torque control start mode (hereinafter, referred to as "WSC mode"). An optimum traveling mode is selected in accordance with the driving state of the vehicle, the accelerator operation of the driver, and so on.

The "EV mode" is a mode in which the first clutch 4 is brought to the disengagement state, and in which the vehicle runs by using only the motor generator 2 as the driving source. The "EV mode" has a motor traveling mode and a regenerative traveling mode. This "EV mode" is selected when the required vehicle driving force by the driver is relatively low.

The "HEV mode" is a mode in which the first clutch 4 is brought to the engagement state, and in which the vehicle runs by using the engine 1 and the motor generator 2 as the driving source. The "HEV mode" has a motor assist traveling mode, a traveling power generation mode, and an engine traveling mode. This "HEV mode" is selected when the required driving force by the driver is relatively large, and there is a request from the system based on the state of the charge (SOC) of the high power battery 12, the driving state of the vehicle, and so on.

The "WSC mode" is a mode which is selected in a region (such as the start of the movement of the vehicle) in which the vehicle speed is relatively low. The transmission torque capacity of the second clutches 5a and 5b are variably controlled while controlling the rotation speed of the motor generator 2. With this, the second clutches 5a and 5b are brought to the slip engagement state.

Figure 2:
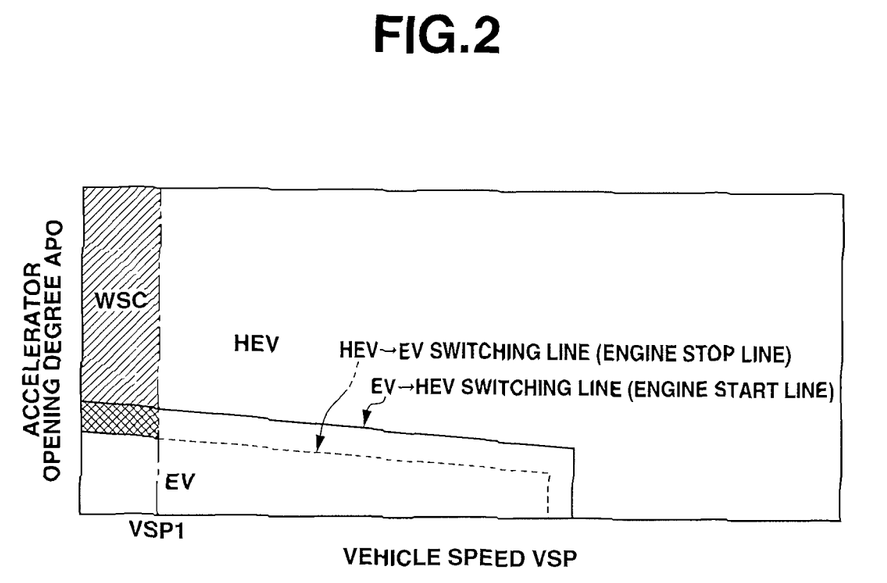
FIG. 2 is a characteristic view showing a characteristic of a mode switching of this hybrid vehicle.

FIG. 2 shows basic characteristics of switching of "EV mode", "HEV mode", and "WSC mode" based on the vehicle speed VSP and the accelerator opening degree APO. As shown in the drawing, "HEV→EV switching line" to shift from the "HEV mode" to the "EV mode", and "EV→HEV switching line" to shift from the "EV mode" to the "HEV mode" are provided to have an appropriate hysteresis. The mode becomes the "WSC mode" in a region in which the vehicle speed is equal to or smaller than a predetermined vehicle speed VSP1.

Figure 3:
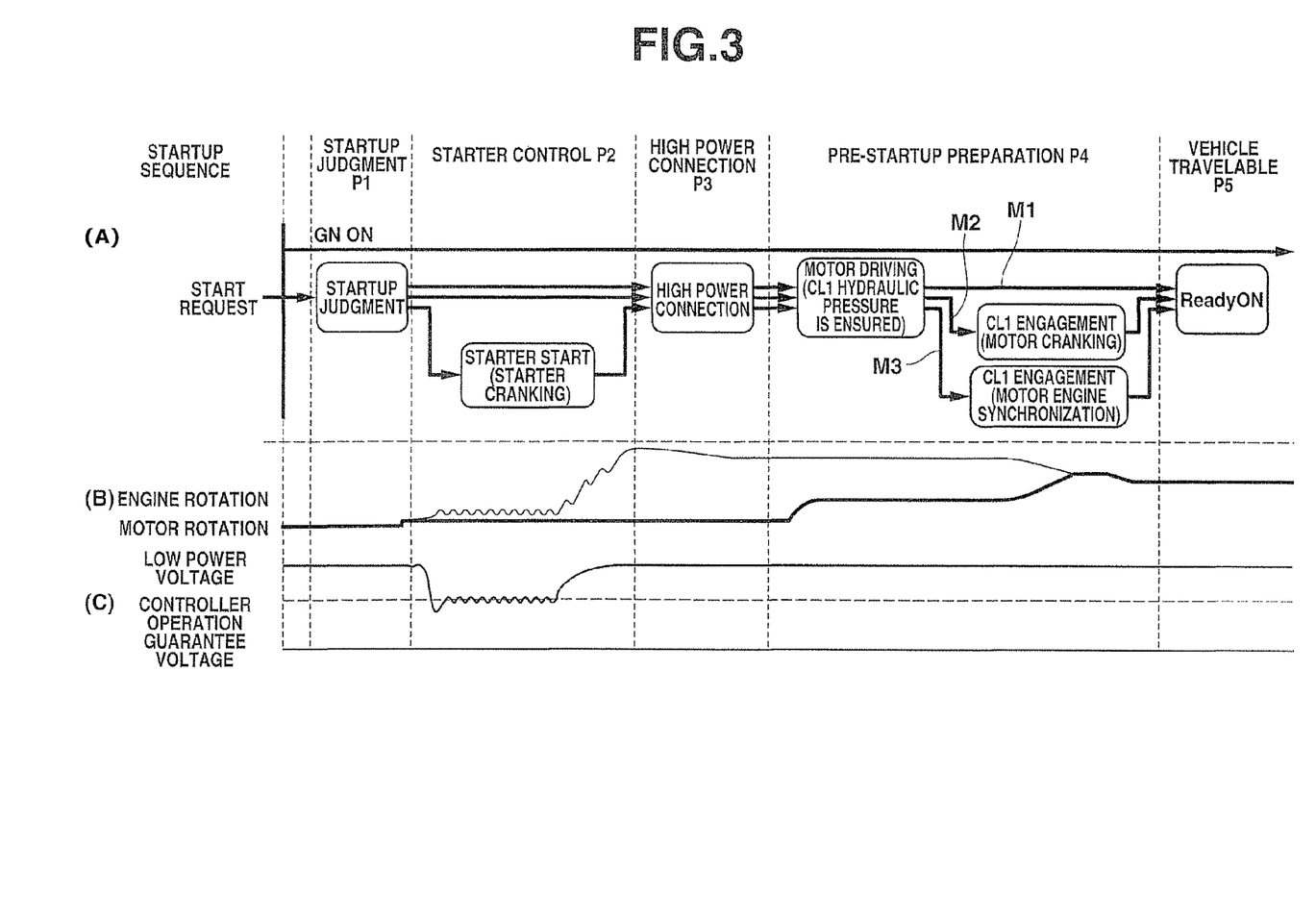
FIG. 3(A) is an explanatory view showing a startup sequence at the detection of the startup request of the hybrid vehicle.
FIGS. 3(B) and 3(C) are explanatory views showing variations of an engine speed, a motor rotation speed, and a voltage of a low power battery, at a startup of the vehicle in the second HEV startup mode.

FIG. 3(A) is an explanatory view showing a startup sequence of a vehicle which is performed in the integral controller 25 at the startup of the vehicle. FIGS. 3(B) and 3(C) show variations of the engine speed, the motor rotation speed, and the output voltage of the low power battery when the second HEV start mode M3 (described later) using the starter 18 is selected. When the request of the vehicle startup (IGN ON) is sensed by the operation of the ignition key (or the ignition switch) by the driver, first, in the startup judgment phase, one of the vehicle start modes is selected from the three vehicle start modes M1 to M3.

The EV startup mode M1 which is the first vehicle startup mode is a startup mode which can finish the startup of the vehicle during a shortest time period (for example, within three seconds), and bring the vehicle to a vehicle travelable state (ReadyOn). Basically, this EV start mode M1 is selected except for the low temperature state and the low output state of the high power battery 12 as described later. In this EV startup mode, the starter control phase P2 described later is omitted, and the process proceeds to the high power connection phase P3. The high power relay 14 is connected so as to bring the motor generator 2 to a state in which the motor generator 2 can be driven by the high power battery 12. In a next pre-startup preparation phase P4, the motor generator 2 is driven. The oil pump 28 is driven by this drive of the motor generator 2, so that the hydraulic pressure within the hydraulic pressure circuit 27 is increased. When the hydraulic pressure necessary for the engagement of the first clutch 4 (CL1) is ensured, the startup of the vehicle is finished. The process proceeds to the vehicle travelable phase P5. The vehicle becomes the travelable state in which the vehicle can run by the EV mode.

The first HEV startup mode M2 which is the second vehicle startup mode is a startup mode which is selected in a case where it is supposed that there is a problem of the response delay of the vehicle driving force since it takes (requires) the time to engage the first clutch 4 and to startup the engine 1 when it is switched from the EV mode to the HEV mode after the completion of the vehicle startup, like the low output state of the high power battery 12 and the low temperature state in which the viscosity of the hydraulic fluid is high. In this first HEV startup mode M2, first, the high power relay 14 is connected in the high power connection phase P3 so as to bring the motor generator 12 to a state in which the motor generator 12 can be driven by the high power battery 12, similarly to the first startup mode M1. In the next pre-startup preparation phase P4, the motor generator 2 is driven. The oil pump 28 is driven by this drive of the motor generator 2, so that the hydraulic pressure within the hydraulic pressure circuit 27 is increased. When the hydraulic pressure necessary for the engagement of the first clutch 4 is ensured, the first clutch 4 is engaged. The motor cranking to rotationally drive the crank shaft 1a of the engine 1 by the motor generator 2 is performed so that the engine 1 is started. When the start of the engine 1 is finished, the startup of the vehicle is finished. The process proceeds to the vehicle travelable phase. The vehicle becomes the travelable state in which the vehicle can run in the HEV mode.

The second HEV startup mode M3 which is the third vehicle startup mode is a mode which is selected in a state in which it is supposed to be not able to or to be extremely difficult to start the engine 1 by the motor generator 2, like the extremely low temperature state and the extremely low output state of the high power battery 12. In this second HEV startup mode M3, first, the process proceeds to the starter control phase P2. The starter cranking to rotationally drive the crank shaft 1a of the engine 1 by the starter 18 is performed. Then, the process proceeds to the high power connection phase P3 after the completion of the start of the engine by the starter cranking. The high power relay 14 is connected so as to bring the motor generator 2 to a state in which the motor generator 2 can be driven. In the next pre-startup preparation phase P4, the motor generator 2 is driven. The oil pump 28 is driven by this drive of the motor generator 2 so that the hydraulic pressure within the hydraulic pressure circuit 27 is increased. When the hydraulic pressure necessary for the engagement of the first clutch 4 is ensured, the first clutch 4 is engaged. The rotation speed of the motor generator 2 and the engine speed are synchronized. At this engagement of the first clutch 4, the first clutch 4 is gradually engaged while synchronizing the rotation speed of the motor generator 2 and the engine speed, for example, by controlling the rotation speed of the motor generator 2, so as not to generate the torque shock. When the engagement of the first clutch 4 is finished, the startup of the vehicle is finished. The process proceeds to the vehicle travelable phase P5. The vehicle becomes the travelable state in which the vehicle can run in the HEV mode.

Figure 4:
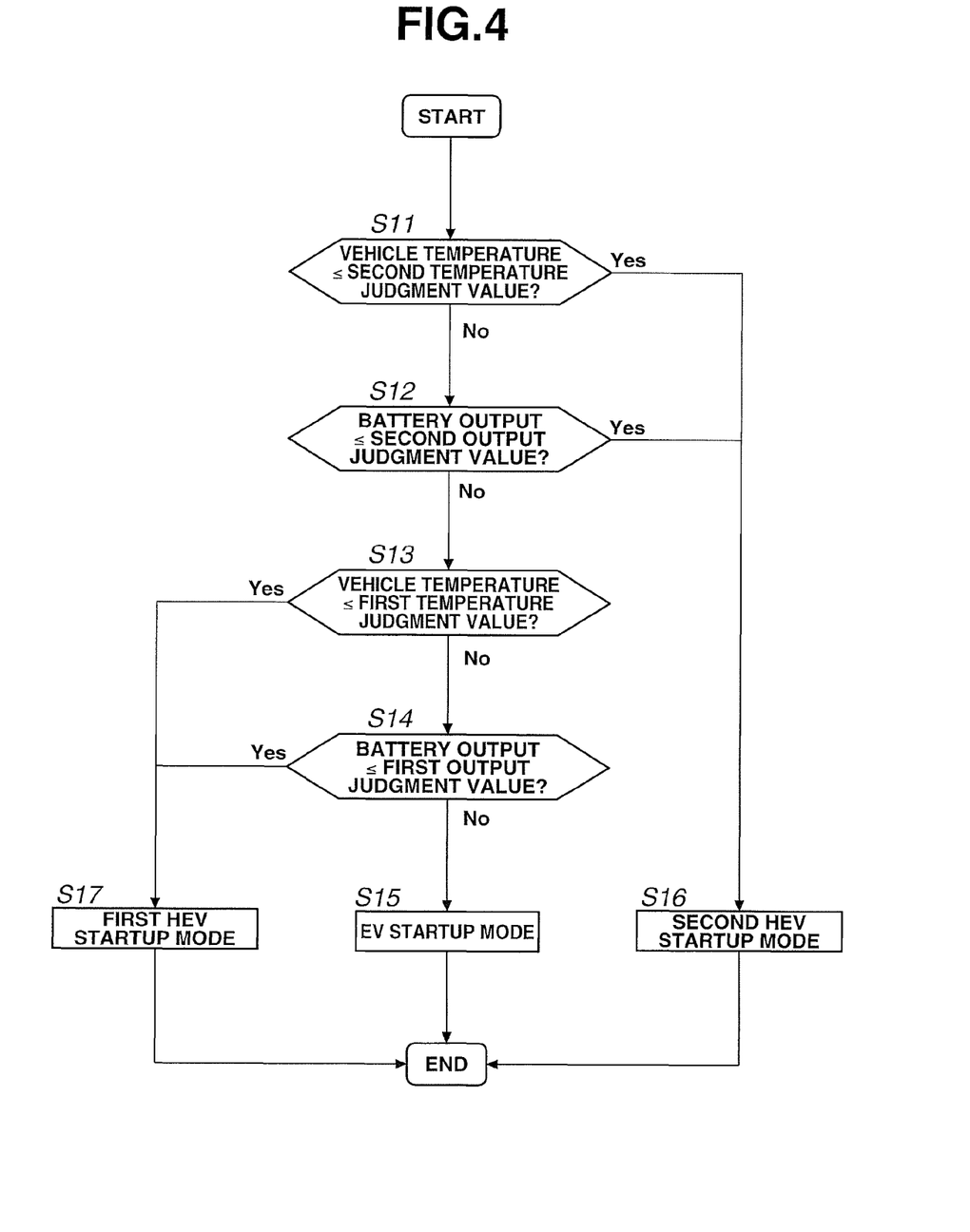
FIG. 4 is a flow chart showing a selection operation of the startup pattern at the detection of the request of the startup of the hybrid vehicle.

FIG. 4 is a flow chart showing a selection operation of the vehicle startup modes in the vehicle startup phase P1. This routine is performed, for example, by the integral controller 25 when the vehicle startup request is detected.

At step S11, it is judged whether or not it is in the extremely low temperature state in which the temperature of the vehicle is equal to or lower than the second temperature judgment value. The second temperature judgment value is set so that the start of the engine 1 by the motor generator 2 cannot be performed or is difficult to be performed when the temperature of the vehicle is lower than the second temperature judgment value. For example, the second temperature judgment value is set to a value near $-15°$ C. The second temperature judgement value is previously set by the adaptation and so on. One or plurality of the temperatures which are sensed by the above-described temperature sensors 37 to 43 is used as the temperature of the vehicle. For example, when one of the engine water temperature, the battery temperature, and the hydraulic fluid temperature is equal to or lower than the second temperature judgment value, the extremely low temperature state is judged. The process proceeds from step S11 to step S16. The second HEV startup mode M3 is selected.

At step S12, it is judged whether or not the battery output (the voltage) of the high power battery 12 which is sensed by the battery voltage sensor 31 is equal to or lower than a predetermined second output judgment value. The second output judgment value is set so that the start of the engine 1 cannot be performed or is extremely difficult to be performed when the battery output becomes lower than the second output judgment value. When the battery output is equal to or lower than the second output judgment value, the process proceeds from step S12 to step S16. The second HEV startup mode M3 is selected.

Figure 5:
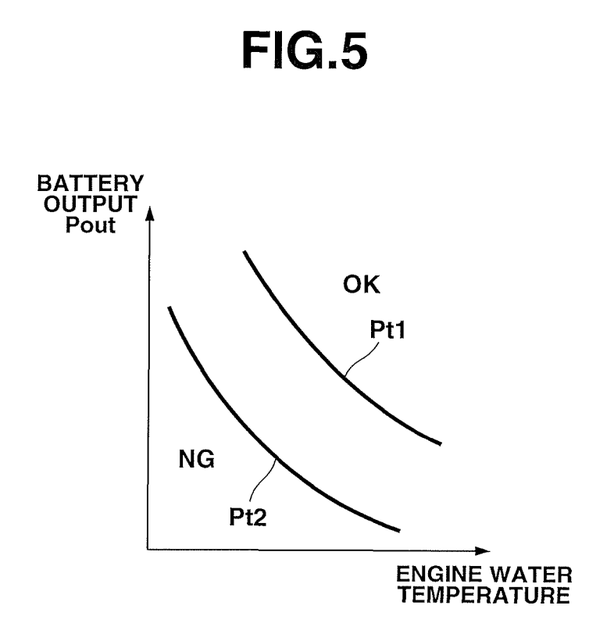
FIG. 5 is a characteristic view showing one example of a control map used for the judgment of the battery output of the high power battery.

FIG. 5 shows one example of a control map used for the judgment of step S12. As shown in FIG. 5, the battery output Pout of the high power battery 12 which is necessary for the start (the motor cranking) of the engine 1 by the motor generator 2 becomes larger as the engine water temperature which is the temperature of the vehicle becomes lower. Accordingly, a value of the second output judgment table Pt2 which shows the second output judgment value becomes lower as the engine water temperature becomes lower. The control map of FIG. 5 is looked up based on the engine water temperature (the vehicle temperature) and the battery output. In a case where the current engine water temperature and the current battery output are in an NG region which is on the left lower side of the second output judgment table Pt2, it is judged that it is the extremely low output state in which the battery output Pout is equal to or lower than the second output judgment value.

With reference again to FIG. 4, at step S13, it is judged whether or not it is the lower temperature state in which the vehicle temperature is equal to or lower than the first temperature judgment value. The first temperature judgment value is at least greater than the second temperature judgment value. The first temperature judgment value corresponds to the vehicle temperature (for example, a value near 0° C.) by which there is a problem of the response delay of the vehicle driving force at the switching from the EV mode to the HEV mode by taking the time to engage the first clutch 4, that is, the time to start the engine 1 by the motor generator 2 (the motor cranking), since the viscosity of the hydraulic fluid is increased when the vehicle temperature becomes equal to or lower than the first temperature judgment value. When the vehicle is in the low temperature state in which the vehicle temperature is equal to or lower than the first temperature judgment value, the process proceeds from step S13 to step S17. The first HEV startup mode is selected.

At step S14, it is judged whether or not the battery output is equal to or lower than the predetermined first output judgment value. The first output judgment value is at least larger than the second output judgment value. The first output judgment value corresponds to the battery output at which there is a problem of the response delay at the switching from the EV mode to the HEV mode by taking (requiring) the start time period of the engine 1 by the motor generator 2 when the battery output becomes lower than the first output judgment value. When the vehicle is in the low output state in which the battery output is equal to or smaller than the first output judgment value, the process proceeds from step S14 to step S17. The first HEV mode M2 is selected.

With reference to FIG. 5, the time period necessary for the start (the motor cranking) of the engine 1 by the motor generator 2 is increased as the engine water temperature which is the vehicle temperature is lowered. Accordingly, the value of the first output judgment table Pt1 showing the first output judgment value becomes lower as the engine water temperature becomes lower. The control map of FIG. 5 is looked up based on the engine water temperature (the vehicle temperature) and the battery output. In a case where the current engine water temperature and the current battery output is in an NG region which is on the left lower side of the first output judgment table Pt1, it is judged that the vehicle is in the low output state in which the battery output Pout is equal to or lower than the first output judgment value.

With reference again to FIG. 4, when all of the judgements of steps S11 to S14 are denied, the process proceeds to step S15. The EV startup mode is selected. That is, when the vehicle is in the normal temperature state in which the vehicle temperature exceeds at least the first temperature judgment value (the value near 0° C.) and the battery output of the high power battery 12 is enough (has the room), the EV startup mode M1 in which the engine 1 is not started is selected.

As described above, in one or more embodiments of the present invention, one of the three vehicle startup modes M1 to M3 is selected at the detection of the vehicle startup request, based on the vehicle temperature and the battery output of the high power battery 12. Accordingly, it is possible to surely perform the startup of the vehicle during the short time period in accordance with the vehicle temperature and the output of the high power battery 12.

In particular, in the low temperature state in which the vehicle temperature is equal to or lower than the first temperature judgment value, the first HEV startup mode M2 (the second vehicle startup mode) is selected. After the engine is started by the motor generator 2, the vehicle is brought to the travelable state. This reason is described below. In the low temperature state, the viscosity of the hydraulic fluid becomes high, and it takes the time to engage the first clutch 4. It takes the time to start the engine by the motor generator 2. Accordingly, if the vehicle is started up by the EV startup mode M1 in the low temperature state, when the vehicle is switched from the EV mode to the HEV mode in accordance with the accelerator operation and so on by the driver after the vehicle becomes the travelable state, it takes the time to start the engine together with the engagement of the first clutch 4. The response delay of the increase of the vehicle driving force may be caused. Consequently, when the vehicle is started to be moved, for example, at the steep uphill, it is not possible to rapidly obtain the desired vehicle driving force. It may provide the feeling to move the vehicle in the rearward direction, to the driver.

In one or more embodiments of the present invention, the first HEV startup mode M2 is selected in this low temperature state. The first clutch 4 is previously selected before the completion of the startup of the vehicle. The engine 1 is started by the motor generator 2. Accordingly, it takes little more time (about 5 to 6 seconds) to start up the vehicle, relative to the case in which the EV startup mode M1 is selected. However, the response delay of the vehicle driving force according to the delay of the engine startup is not generated after the vehicle becomes the travelable state. It is possible to improve the response of the vehicle driving force. Moreover, it is possible to decrease the time periods necessary for the startup of the vehicle, relative to a case in which the second HEV startup mode M3 in which the engine 1 is started by the starter 18 is selected.

Moreover, if the vehicle is started up by the EV startup mode when the vehicle is in the low output state in which the battery output of the high power battery 12 is equal to or smaller than the first output judgment value, it takes the time to start up the engine 1 by the motor generator 2 due to the deficiency of the output of the high power battery 12. The response delay of the vehicle driving force may be caused similarly to the low temperature state. Accordingly, the first HEV startup mode M2 (the second vehicle startup mode) is also selected in this low output state of the high power battery 12. After the engine 1 is started by the motor generator 2, the vehicle is brought to the travelable state. With this, the response delay of the vehicle driving force according to the delay of the start of the engine is not generated after the vehicle becomes the travelable state. It is possible to improve the response of the vehicle driving force.

In the extremely low temperature state in which the vehicle temperature is equal to or smaller than the second temperature judgment value, the viscosity of the hydraulic fluid is extremely high. It is not possible to or is very difficult to engage the first clutch 4 before the start of the engine 1. Accordingly, in one or more embodiments of the present invention, the second HEV startup mode M3 (the third vehicle startup mode) is selected in this extremely low temperature state. It takes the time (10 seconds or more in a case where it is long) to start up the vehicle. However, the engine 1 is surely started by the starter 18 before the completion of the vehicle startup.

When the vehicle is in the extremely output state in which the battery output of the high power battery 12 is equal to or smaller than the second output judgment value, it is not possible to or is very difficult to start the engine 1 by the motor generator 2 due to the deficiency of the output of the high power battery 12. Accordingly, the second HEV startup mode M3 (the third vehicle startup mode) is selected. The engine 1 is surely started by the starter 18 before the completion of the vehicle startup.

When the vehicle is started by the second HEV startup mode M3, the voltage of the low power battery 17 is temporally/instantaneously largely decreased at the cranking of the engine 1 by the starter 18, as shown in FIG. 3(C). Accordingly, if the high power relay 14 arranged to be operated by the supply of the power from the low power battery 17 is connected during the cranking by this starter 18, the chattering may be generated. Accordingly, for avoiding the generation of this chattering of the high power relay 14, the high power relay 14 is connected after the start of the engine 1 by the starter 18 is finished, so that the motor generator 2 is brought to the drivable state.

In one or more of the above-described embodiments, the startup judgment is performed based on the battery output of the high power battery 12. However, the startup judgment may be performed based on the state of the charge (SOC) of the high power battery 12. In particular, in a case where the residual amount of the charge of the high power battery 12 is small and the startup of the engine 1 by the motor generator 2 cannot be performed, the second HEV startup mode M3 may be selected. The engine 1 may be surely started by the starter 18.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A startup control device for a hybrid vehicle which includes an engine, a traveling motor disposed between the engine and driving wheels, a high power battery arranged to supply a power to the traveling motor, a clutch disposed between the engine and the, traveling motor and arranged to be engaged when a hydraulic pressure is supplied, and a starter arranged to rotationally drive a crank shaft of the engine, and thereby to start the engine, the startup control device comprising:
   a controller comprising:
      a vehicle temperature sensor configured to sense a temperature of the vehicle; and
      a vehicle startup controller configured to select one of vehicle startup modes of a first vehicle startup mode in which the vehicle is brought to a travelable state by the traveling motor, a second vehicle startup mode in which the vehicle is brought to the travelable state by engaging the clutch, and starting the engine by the traveling motor, and a third vehicle startup mode in which the vehicle is brought to the travelable state by engaging the clutch after the engine is started by the starter, at least based on the temperature of the vehicle when a request of the startup of the vehicle is sensed, wherein the vehicle startup controller is configured to select the second vehicle startup mode in a low temperature state in which the temperature of the vehicle is equal to or smaller than at least a first temperature judgment value when the request of the startup of the vehicle is sensed, and to select the third vehicle startup mode in an extremely low temperature state in which the temperature of the vehicle is equal to or smaller than a second vehicle temperature judgment value which is smaller than the first temperature judgment value when the request of the startup of the vehicle is sensed, and wherein the startup control device further comprises:
   a high power relay provided in a high power circuit connecting the high power battery and the traveling motor, and
   a low power battery arranged to supply the power to the high power relay, the starter, and the controller, and wherein the high power relay is connected in the third vehicle startup mode after the engine is started by the starter.

2. The startup control device for the hybrid vehicle as claimed in claim 1, wherein the startup control device comprises a low power battery arranged to supply a power to the starter and the vehicle startup controller, and a battery output sensor arranged to sense the output of the high power battery; and the vehicle startup controller is configured to select the second vehicle startup mode when the output of the high power battery is equal to or smaller than a first output judgment value, and to select the third vehicle startup mode when the output of the high power battery is equal to or smaller than a second output judgment value that is smaller than the first output judgment value.

3. A startup control method for a hybrid vehicle which includes an engine, a traveling motor disposed between the engine and driving wheels, a high power battery arranged to supply a power to the traveling motor, a clutch disposed between the engine and the traveling motor, and arranged to be engaged when a hydraulic pressure is supplied, and a starter arranged to rotationally drive a crank shaft of the engine, and thereby to start the engine, the startup control method comprising:
   sensing a temperature of the vehicle;
   selecting one of vehicle startup modes of a first vehicle startup mode in which the vehicle is brought to a travelable state by the traveling motor, a second vehicle startup mode in which the vehicle is brought to the travelable state by engaging the clutch, and starting the engine by the traveling motor, and a third vehicle startup mode in which the vehicle is brought to the travelable state by engaging the clutch after the engine is started by the starter, at least based on the temperature of the vehicle when a request of the startup of the vehicle is sensed; and
   selecting the second vehicle startup mode in a low temperature state in which the temperature of the vehicle is equal to or smaller than at least a first temperature judgment value when the request of the startup of the vehicle is sensed, and to select the third vehicle startup mode in an extremely low temperature state in which the temperature of the vehicle is equal to or smaller than a second vehicle temperature judgment value which is smaller than the first temperature judgment value when the request of the startup of the vehicle is sensed, wherein the startup control method further comprises:
  connecting the high power battery and the traveling motor via a high power relay provided in a high power circuit,
  supplying the power to the high power relay, the starter, and the controller via a low power battery, and
  connecting the high power relay in the third vehicle startup mode after the engine is started by the starter.

\* \* \* \* \*